United States Patent
Roos et al.

(10) Patent No.: US 10,454,566 B2
(45) Date of Patent: *Oct. 22, 2019

(54) METHOD AND APPARATUS FOR A TRIPLE USE SATELLITE SYSTEM

(71) Applicant: Hughes Network Systems, LLC, Germantown, MD (US)

(72) Inventors: Dave Roos, Boyds, MD (US); Adrian Morris, Darnestown, MD (US); Stanley Kay, Rockville, MD (US); Pradman Kaul, Potomac, MD (US)

(73) Assignee: HUGHES NETWORK SYSTEMS, llc, Germantown, MD (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/028,625

(22) Filed: Sep. 17, 2013

(65) Prior Publication Data
US 2014/0064179 A1 Mar. 6, 2014

Related U.S. Application Data

(63) Continuation of application No. 13/086,628, filed on Apr. 14, 2011, now Pat. No. 8,559,357.

(60) Provisional application No. 61/324,103, filed on Apr. 14, 2010.

(51) Int. Cl.
*H04L 12/28* (2006.01)
*H04B 7/185* (2006.01)
*H04B 7/204* (2006.01)

(52) U.S. Cl.
CPC ..... *H04B 7/18523* (2013.01); *H04B 7/18528* (2013.01); *H04B 7/18578* (2013.01); *H04B 7/2041* (2013.01)

(58) Field of Classification Search
None
See application file for complete search history.

(56) References Cited

U.S. PATENT DOCUMENTS

| | | | |
|---|---|---|---|
| 5,592,470 A | 1/1997 | Rudrapatna et al. | |
| 6,704,543 B1* | 3/2004 | Sharon | H04B 7/18584 455/12.1 |
| 6,788,917 B1 | 9/2004 | Refai et al. | |
| 6,940,833 B2 | 9/2005 | Jonas et al. | |
| 7,382,743 B1* | 6/2008 | Rao | H01Q 1/288 370/316 |
| 7,852,855 B1 | 12/2010 | Gooding et al. | |
| 2001/0043575 A1 | 11/2001 | Frank | |
| 2003/0217362 A1* | 11/2003 | Summers | H04H 20/42 725/63 |
| 2004/0072561 A1* | 4/2004 | LaPrade | H04B 7/18582 455/427 |
| 2004/0092227 A1* | 5/2004 | Sarraf | H04B 7/2041 455/12.1 |
| 2005/0053033 A1 | 3/2005 | Kelly et al. | |
| 2005/0140563 A1 | 6/2005 | Eom et al. | |

(Continued)

*Primary Examiner* — Noel R Beharry
*Assistant Examiner* — Lionel Preval
(74) *Attorney, Agent, or Firm* — K&L Gates LLP

(57) ABSTRACT

A triple use satellite system includes a VSAT population including a VSAT, and a satellite including a broadcast beam for a broadcast service and spot beams for a broadband service, where each of the spot beams provides broadband service to VSATs in separate coverage areas in a geographic region and the broadcast beam provides a broadcast service to the VSAT population in the geographic region.

19 Claims, 4 Drawing Sheets

(56) References Cited

U.S. PATENT DOCUMENTS

2012/0020280 A1\* 1/2012 Jansson ............. H04B 7/18582
                                                     370/316
2014/0335780 A1\* 11/2014 Rosen ................ H04B 7/18578
                                                     455/12.1

\* cited by examiner

METHOD AND APPARATUS FOR A TRIPLE USE SATELLITE SYSTEM

CROSS REFERENCES TO RELATED APPLICATIONS

The present application is a continuation of U.S. application Ser. No. 13/086,628, filed Apr. 14, 2011, which claims priority to Provisional Application No. 61/324,103, filed on Apr. 14, 2010, the entire contents of each of which are hereby incorporated by reference.

BACKGROUND

Conventional satellite systems may be based on a single-use satellite design which may provide either a single, broad coverage beam, or many small spot beams. Satellite systems may provide service to a particular geographic region in one of two ways: a single (or a few) large broadcast beams providing a broadcast service, or many smaller spot beams, the union of whose coverage areas may encompass the desired geographic coverage and provide broadband service. The many current Ku band satellites in use today may be representative satellites with broadcast beams, and the Spaceway, AMC-15, and HYLAS satellites may be examples of satellites with spot beams. Either satellite type may represent a substantial investment to develop and launch. A region which desired broadband, broadcast, and interactive broadcast service may require coverage from two or more satellites, including one of each type. Some regions may not merit the expense of two or more satellites that may be needed to provide the three types of services.

SUMMARY

It is an object of the present invention to provide a method and apparatus for a triple use satellite system.

In accordance with an aspect of the present invention, a triple use satellite system includes a VSAT population including a VSAT and a satellite including a broadcast beam for a broadcast service and spot beams for a broadband service, where each of the spot beams provides broadband service to VSATs in separate coverage areas in a geographic region and the broadcast beam provides a broadcast service to the VSAT population in the geographic region.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Additional features and advantages are described herein, and will be apparent from the following Detailed Description and the figures.

DETAILED DESCRIPTION

Embodiments of the present application will be described below in detail with reference to the drawings.

Figure 1:
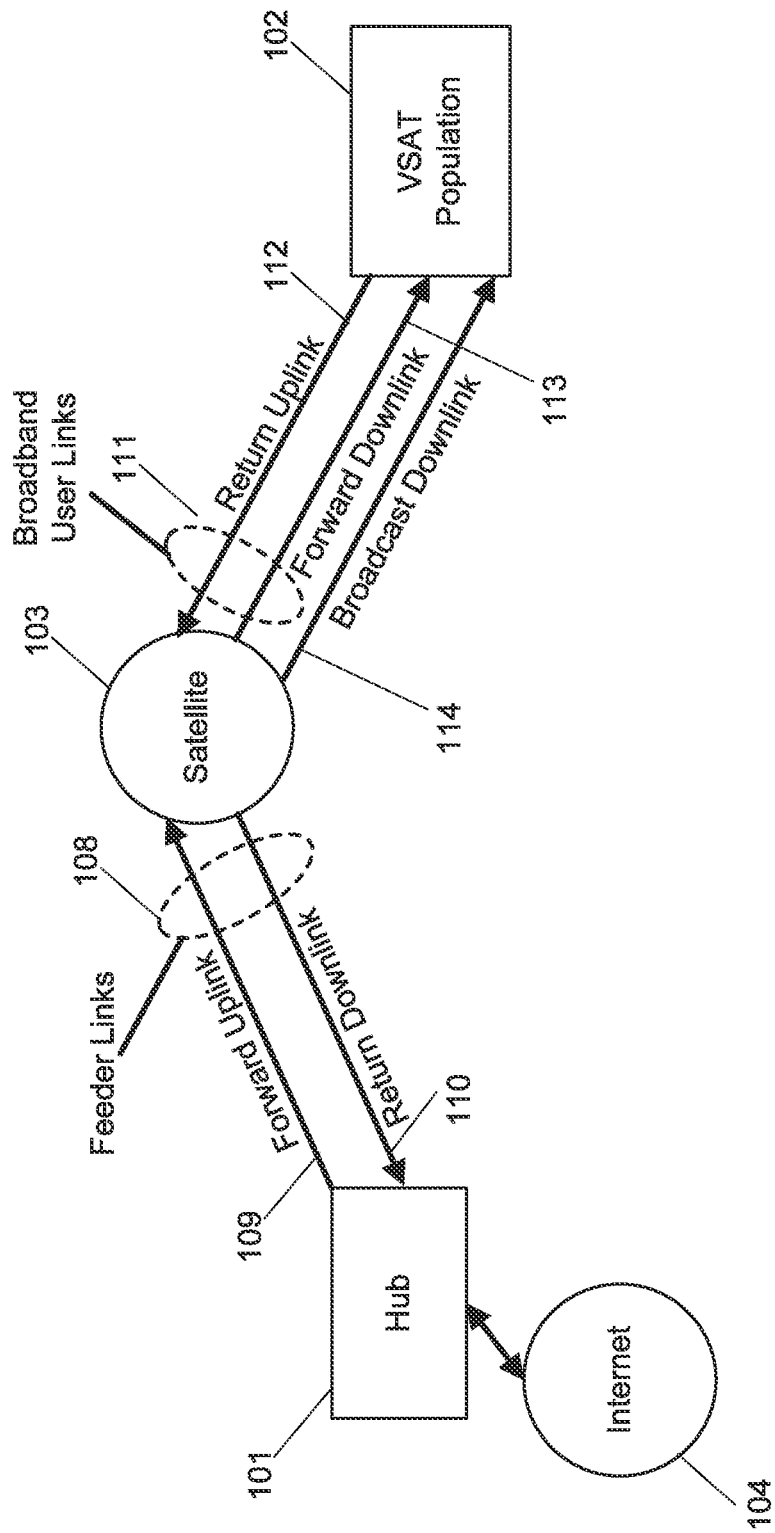
FIG. 1 depicts an exemplary triple use satellite system.

FIG. 1 depicts an exemplary triple use satellite system. The triple use satellite system may include a hub 101, a Very Small Aperture Terminal (VSAT) population 102, a satellite 103, and the Internet 104.

The hub 101 may be a hub or gateway for a satellite communications system, and may be connected to the VSATs in the VSAT population 102 through the satellite 103. Feeder links 108 may carry data between the hubs and the satellite 103, and may include a forward uplink 109 for transmitting data from a hub to the satellite 103, and the return downlink 110 for transmitting data from the satellite to a hub. User broadband links 111 may carry data between the satellite 103 and the VSATs, and may include the return uplink 112 for transmitting data from a VSAT to the satellite 103, and a forward downlink 113 for transmitting data from the satellite 103 to a VSAT. The user broadband links 111 may enable the provision of broadband service to the VSATs. A broadcast downlink 114 may also be transmitted to the VSAT population 102 by the satellite 103. The hub 101 may be a high capacity, large antenna earth station with connectivity to ground telecommunications infrastructure.

The VSAT population 102 may include a number of VSATs, which may be used by end users to access the satellite communications system. A VSAT may include a remote satellite dish for receiving RF signals from and transmitting RF signals to the satellite 103, a satellite modem and other equipment for managing the sending and receiving of data, and one or more remote hosts, which may be computer systems or other electronic devices capable of network communications at a site remote from the hub 101. For example, a VSAT may be used at a residence or place of business to provide access to the Internet 104.

The satellite 103 may be any suitable communications satellite for connecting the hub 101 to the remote hosts 116. The satellite 103 may use spot beams and frequency and polarization reuse to maximize the total capacity of the system. Signals passing through the satellite 103 in the forward direction, towards the VSATs, may be based on the DVB S.2 standard (ETSI EN 302 307) using signal constellations up to and including at least 16-APSK. The signals intended to pass through the satellite 103 in the return direction, toward the hubs, may be based on the IPoS standard (ETSI TS 102 354). Other suitable signal types may also be used in either direction, including, for example higher data rate variations of DVB S.2.

The hub 101 may be connected to the Internet 104. Remote terminals connected to VSATs in the VSAT population 102 may connect to the Internet 104 through the satellite 103 and the hub 101. Data sent from the VSAT to the Internet 104 may be transmitted to the satellite 103 on the return uplink 112, then from the satellite 103 to the hub 101 using the return downlink 110. The hub 101 may then transmit the data to the Internet 104. Data from the Internet 104 may be sent to a VSAT in the VSAT population 102 by being transmitted to the hub 101, then to the satellite 103 on the forward uplink 109, and then to the VSAT using the forward downlink 113.

For example, a computer connected to a VSAT may wish to access a specific web page on the Internet 104. Data requesting the web page may be sent from the VSAT to the satellite 103 on the return uplink 112. The satellite 103 may send the request to the hub 101 on the return downlink 110. The hub 101 may then access the data for the requested web page from the Internet 104, and send the web page data to the satellite 103 on the forward uplink 109. The satellite 103 may send the web page data to the requesting VSAT on the forward downlink 113, where the web page data may be passed to the requesting computer connected to the VSAT.

The satellite 103 may be responsible for providing access to the satellite communications system to more than one VSAT from the VSAT population 102, and there may be more than one satellite 103. The satellite 103 may also be responsible for providing a broadcast service.

Figure 2:
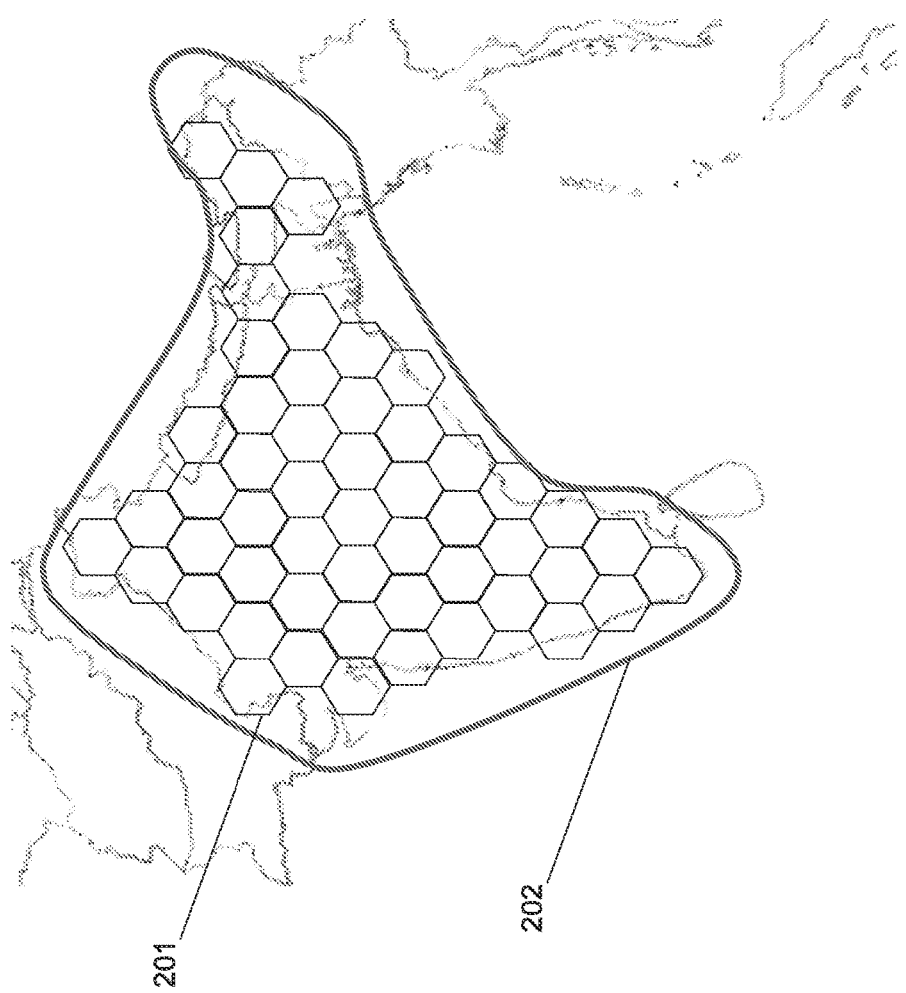
FIG. 2 depicts an exemplary satellite coverage plan for a triple use satellite system.

FIG. 2 depicts an exemplary satellite coverage plan for a triple use satellite service. An exemplary satellite coverage plan for India may require 52 spot beams carrying the forward downlink 113, creating 52 separate coverage areas 201. By dividing the geographic area among 52 coverage areas 201, the VSAT population 102 in each of the coverage areas 201 may be provided with broadband service. The spot beams may be capable of tens of Gigabits per second (Gbps) of forward capacity because of the extensive frequency reuse that many spot beams allow.

If a broadcast service, where, for example, the same data is sent to the entire VSAT population 102 in a geographic area, were offered for all of the coverage areas 201, the data for the broadcast service may need to be carried separately on each of the 52 spot beams. This may be an inefficient use of bandwidth, as the broadcast data would be repeated 52 times.

Instead of repeating the broadcast data 52 times across the spot beams, the satellite 103 may overlay a single broadcast beam across all of the spot beams. The broadcast beam may create a broadcast coverage area 202, which may encompass all of the coverage areas 201 covered by the spot beams. Using the broadcast beam, which may carry the broadcast downlink 114, broadcast data may be sent only once to the entire geographic area, where the data may be received by the entire VSAT population 102. The broadband service provided in the coverage areas 201 by the 52 spot beams may continue to operate normally. If the frequency bands used by the broadband and broadcast services are disjoint, for example, if the Ka band is used for the broadcast beams and the Ku band for the broadcast beam, there may be no interference between the two services. The resources in the satellite 103, for example the amplifiers, power, and so on, may be divided between the two services in proportion to the services' requirements.

The satellite 103 may include one or more antennas including one or more feed horns and one or more reflectors. A satellite 103 with spot beams may have a number of feed horns pointing to each reflector, and the positions of the feed horns may determine where on the earth's surface the spot beams fall. A broadcast satellite 103 may have a shaped reflector whose shape may cause the broadcast beam to take on the shape of the coverage area, for example the broadcast coverage area 202. Because the area of illumination of the reflector is different between the spot beams and the broadcast beam, the shaping of the reflector may not affect the shapes of the spot beams in the same way as for the broadcast beam, so the same reflector may be used for both spot beams and for the shaped broadcast beam on the satellite 103. The satellite 103 may also include separate reflectors for the broadcast beam and the spot beams.

The architecture of the satellite 103 payload may be the same for the broadcast service and for the forward path of the broadband service. Data from the hub 101 may be transmitted on the forward uplink 109 to the satellite 103. The satellite 103 may frequency translate the forward uplink 109 and retransmit the data to the ground using either the broadcast beam carrying the broadcast downlink 114 or the spot beam carrying the forward downlink 113 for the broadband service. The number and bandwidth of each such channel may be sized to suit the traffic needs of the respective service.

If disjoint frequency bands are not available, the broadcast beam may interfere with the spot beams if frequency usage isn't managed properly. This may result in a degradation of the bandwidth available to the VSAT population 102 on the broadband service.

Figure 3:
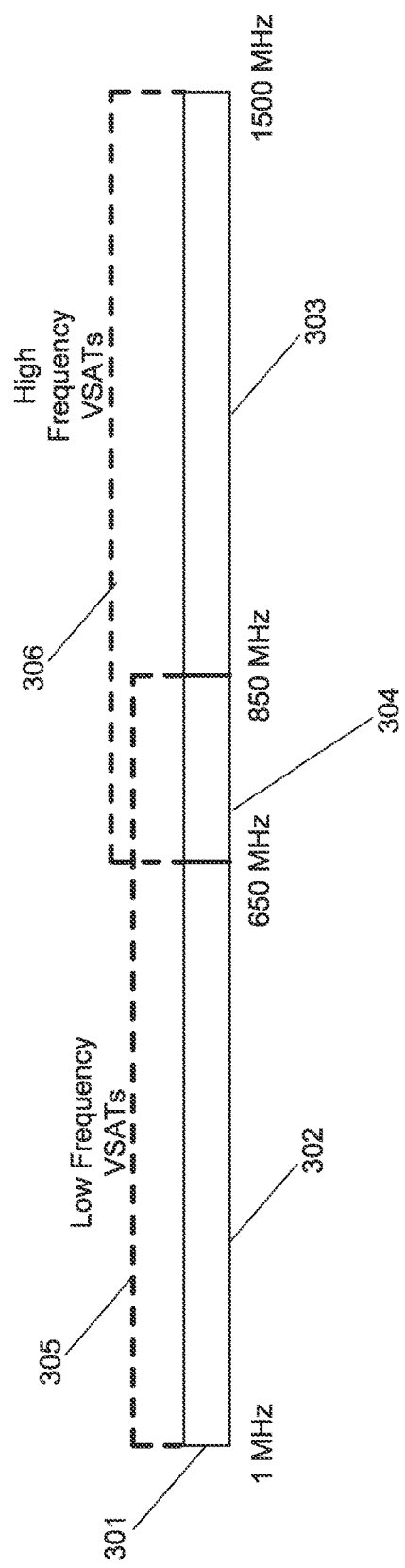
FIG. 3 depicts an exemplary downlink frequency plan.

FIG. 3 depicts an exemplary downlink frequency plan. If disjoint frequency bands aren't available for the broadcast service and the broadband service, the available bandwidth may be managed to prevent interference. For example, at Ka band frequencies, international allocations may provide for 1.5 GHz of bandwidth 301. Producing low-cost VSATs that are able to receive that amount of bandwidth may be problematic, as conventional receivers may receive only 1 GHz of bandwidth without changes in the local oscillator structure of the VSAT's receiver. Such conventional designs may provide only a little more than ½ of the bandwidth in each of two variations of VSATs. Half of the VSATs in the VSAT population 102 may be capable of operating on the upper half of the bandwidth 301, and the other half may operate on the lower half of the bandwidth 301.

The bandwidth 301 may be divided into three bands. A low frequency band 302 serving approximately half of the VSATs with broadband for the forward downlink 113, a high frequency band 303 serving the other half of the VSATs with broadband for the forward downlink 113, and a middle broadcast band 304, which may be used for the broadcast beam carrying the broadcast downlink 114. For example, the low frequency band 302 may be the first 650 MHz of the bandwidth 301, the high frequency band 303 may be the last 650 MHz of the bandwidth 301, and the middle broadcast band 304 may be the 200 MHz in between. The bandwidth may be allocated in any other suitable manner according the needs of the broadband and broadcast services, for example, increasing or decreasing the size of the middle broadcast band 304.

A low-frequency VSAT 305 may receive the low frequency band 302 plus the middle broadcast band 304, and a high-frequency VSAT 306 may receive the middle broadcast band 304 plus the high frequency band 303. For example, the low-frequency VSAT 305 may receive the first 850 MHz of the bandwidth 301, and the high-frequency VSAT 306 may receive the last 850 MHz of the bandwidth 301, resulting in both receiving the middle 200 MHz. In this way, every VSAT in the VSAT population 102 may be capable of receiving both the broadband service and the broadcast service, without requiring that the broadcast downlink 114 be sent twice, and without the broadcast service interfering with the broadband service.

The broadcast service provided by the satellite 103 in the broadcast coverage area 202 may be interactive. The return uplink 112 from a VSAT to the satellite 103 may allow for end users of the VSAT to interact with the broadband service of the satellite system by sending outgoing data from the VSAT back to the hub 101, for example, to request web pages or send out email. The return uplink 112 may also be used to allow the end users to interact with the broadband service. For example, end users may use the return uplink 112 to request that specific types of information be included in the broadcast downlink 114. This may require no modifications to the VSATs, as the VSATs may already be configured to use the return uplink 112 as part of the broadband service.

Figure 4:
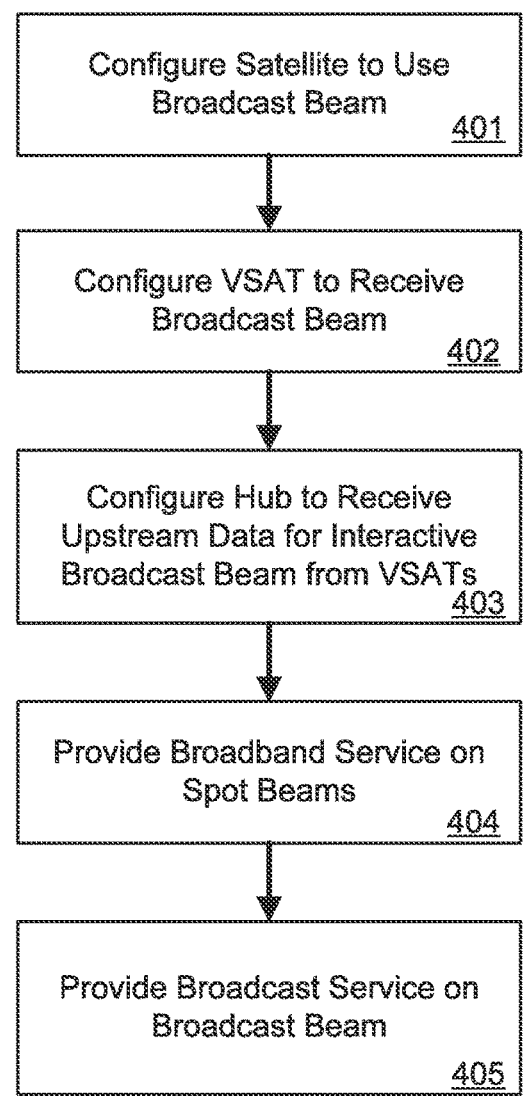
FIG. 4 depicts an exemplary procedure for providing a triple use satellite system.

FIG. 4 depicts an exemplary procedure for providing a triple use satellite system. In block 401, the satellite 103 may be configured to use a broadcast beam. The number of satellites 103 configured to use a broadcast beam may depend on the size of the area to be covered, the number of broadcast coverage areas 202 that are desired, and the number of broadcast beams that may be supported by a single satellite 103. For example, as in FIG. 2, one broadcast beam from one satellite 103 may be use to provide broadcast coverage to an entire geographic region. As another example, a separate broadcast beam may be desired for each time zone in a geographic region, to allow for the broadcast data to be time appropriate for each time zone. For example, the continental United States has four time zones, so four separate broadcast beams may be configured on four separate satellites 103, or four broadcast beams may be configured on one satellite 103, with each broadcast beam providing broadcast coverage to a separate time zone.

In block 402, the VSATs may be configured to receive the broadcast beam. For example, the VSATs in the VSAT population 102 may be configured to receive only a portion of the total available bandwidth. The portion of the bandwidth received by the VSATs may be configured to always include a portion of the bandwidth dedicated to the broadcast service. For example, if a VSAT can receive only 1 GHz of 1.5 GHz of total available bandwidth, and the broadcast service uses bandwidth between 650 MHz from the start of the spectrum to 850 MHz from the start of the spectrum, the VSAT may be configured to always receive between 650 MHz from the start of the spectrum to 850 MHz from the start of the spectrum.

In block 403, the hub 101 may be configured to receive upstream data for an interactive broadcast beam from the VSATs. A VSAT may use the broadband return uplink 112 to send data for interacting with the broadcast service to the satellite 103. The satellite 103 may relay this data to the hub 101 using the return downlink 110, where the data may be mixed in with data for interacting with the broadband service. The hub 101 may be configured to separate out the data for interacting with the broadcast service from other incoming data, allowing the hub 101 to affect the data carried on the broadcast downlink 114 in the appropriate manner.

In block 404, a broadband service may be provided to the VSAT population 102 by spot beams. The satellite 103 may provide broadband service to the VSAT population 102 of a geographic region by focusing spot beams on various coverage areas 201 in the geographic region. Each spot beam may cover a separate coverage area 201, allowing for frequency reuse so all of the VSATs in the VSAT population 102 may have access to enough bandwidth to allow for broadband service. Additional satellites 103 may be used to provide spot beams to the coverage areas 201, depending on how many spot beams each satellite 103 can support, the number of coverage areas 201 needed to cover the VSAT population 102 in the geographic region, and the desired amount of bandwidth to be made available to each VSAT.

In block 405, a broadcast service may be provided to the VSAT population 102 by the broadcast beam configured in block 401. The satellite 103 may provide broadcast service to the VSAT population of the geographic region by shaping a broadcast beam to cover all of the coverage areas 201 already covered by spot beams. The broadcast coverage area 202 may encompass the entire VSAT population 102 with a single broadcast beam. Alternatively, the geographic region may be divided into several broadcast coverage areas 202, and additional broadcast beams may be used to provide broadcast service. The additional broadcast beams may require the use of additional satellites 103 with broadcast beams.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A triple use satellite apparatus comprising:
a satellite comprising a plurality of spot beams for a broadband service in a geographic region and a single broadcast beam for a broadcast service in the geographic region, wherein the broadcast beam is a different beam than a union of the plurality of spot beams, wherein each of the spot beams of the plurality of spot beams includes a forward downlink and a return uplink and provides the broadband service to respective separate coverage areas in the geographic region, and the broadcast beam includes a broadcast downlink that is provided in a different portion of a frequency band than the forward downlink of each one of the plurality of spot beams and provides the broadcast service to all of the respective separate coverage areas in the geographic region, wherein the different portion of the frequency band is in between a lower portion of the frequency band carrying forward downlinks of first spot beams in the plurality of spot beams and a higher portion of the frequency band carrying forward downlinks of different second spot beams in the plurality of spot beams.

2. The apparatus of claim 1, wherein the satellite further comprises a shaped reflector for the broadcast beam, wherein the shaped reflector is shaped to direct the broadcast beam over the geographic region.

3. The apparatus of claim 2, wherein the plurality of spot beams use the shaped reflector.

4. The apparatus of claim 2, wherein the satellite further comprises a reflector for the plurality of spot beams that is separate from the shaped reflector.

5. The apparatus of claim 1, wherein the satellite further comprises receiving equipment for receiving a return uplink from a Very Small Aperture Terminal (VSAT), wherein the return uplink comprises data for interacting with the broadcast service.

6. The apparatus of claim 1, wherein the plurality of spot beams for the broadband service and the broadcast beam for the broadcast service use disjoint frequency bands.

7. The apparatus of claim 1, wherein the plurality of spot beams for the broadband service and the broadcast beam for the broadcast service are separated on a continuous frequency band.

8. A triple use satellite system comprising:
a Very Small Aperture Terminal (VSAT) population comprising a plurality of VSATs; and
a satellite comprising a single broadcast beam for a broadcast service in a geographic region and a plurality of spot beams for a broadband service in the geographic region,
wherein the broadcast beam is a different beam than the plurality of spot beams,
wherein each of the spot beams of the plurality of spot beams includes a forward downlink and a return uplink and provides the broadband service to VSATs in respective separate coverage areas in the geographic region, wherein the broadcast beam includes a broadcast downlink that is provided in a different portion of a frequency band than the forward downlink of each one of the plurality of spot beams and provides the broadcast service to the VSAT population in all of the respective separate coverage areas in the geographic region, and wherein the different portion of the frequency band is in between a lower portion of the frequency band carrying forward downlinks of first spot beams in the plurality of spot beams and a higher portion of the frequency band carrying forward downlinks of different second spot beams in the plurality of spot beams.

9. The system of claim 8, wherein half of the VSATs in the VSAT population receive the lower portion of the frequency band and the other half of the VSATs in the VSAT population receive the upper portion of the frequency band.

10. The system of claim 8, wherein the lower portion and the upper portion of the frequency band overlap in the different portion at a middle portion of the frequency band.

11. The system of claim 8, wherein the VSAT population uses a return uplink for the broadband service to interact with the broadcast service.

12. A method for providing a triple use satellite system comprising:
providing a single broadcast beam for a broadcast service to a geographic region in a broadcast coverage area from a satellite;
providing a plurality of spot beams for a broadband service to the geographic region over a plurality of coverage areas within the broadcast coverage area from the satellite, wherein the broadcast beam is a different beam than the plurality of spot beams, wherein each of the spot beams of the plurality of spot beams includes a forward downlink and a return uplink and provides the broadband service to respective separate coverage areas in the geographic region, and the broadcast beam includes a broadcast downlink that is provided in a different portion of a frequency band than the forward downlink of each one of the plurality of spot beams and provides the broadcast service to all of the respective separate coverage areas in the geographic region, wherein the different portion of the frequency band is in between a lower portion of the frequency band carrying forward downlinks of first spot beams in the plurality of spot beams and a higher portion of the frequency band carrying forward downlinks of different second spot beams in the plurality of spot beams; and
receiving at the satellite a return uplink comprising data for interacting with the broadcast service.

13. The method of claim 12, further comprising:
configuring a Very Small Aperture Terminal (VSAT) in the broadcast coverage area to receive the broadcast beam.

14. The method of claim 12, further comprising:
configuring a hub to process the data for interacting with the broadcast service.

15. The method of claim 12, further comprising:
providing a second broadcast beam for a second broadcast coverage area, wherein the broadcast coverage area and second broadcast coverage area overlap minimally.

16. The method of claim 12, wherein the broadcast beam and the spot beams use disjoint frequency bands.

17. The method of claim 12, wherein the broadcast beam and the spot beams are separated on a continuous frequency band.

18. The apparatus of claim 1, wherein the broadcast beam has a differently shaped geographic coverage area than each of the plurality of spot beams.

19. The apparatus of claim 1, wherein the satellite further comprises a second plurality of spot beams for a second broadband service in a different second geographic region and a single second broadcast beam for a second broadcast service in the second geographic region, wherein the second broadcast beam is a different beam than a union of second the plurality of spot beams, wherein each of the spot beams of the second plurality of spot beams includes a second forward downlink and a second return uplink and provides the second broadband service to respective separate coverage areas in the second geographic region, and the second broadcast beam includes a second broadcast downlink that is provided in a second different portion of the frequency band than the second forward downlink of each one of the second plurality of spot beams and provides the second broadcast service to all of the respective separate coverage areas in the second geographic region.

* * * * *